(12) United States Patent
Cardei (10) Patent No.: US 9,921,298 B2
(45) Date of Patent: Mar. 20, 2018

(54) METHOD AND APPARATUS FOR INCREASING THE RESOLUTION OF A TIME OF FLIGHT PIXEL ARRAY

(71) Applicant: Google Inc., Mountain View, CA (US)

(72) Inventor: Vlad Constantin Cardei, Redwood City, CA (US)

(73) Assignee: Google LLC

( * ) Notice: Subject to any disclaimer, the term of this patent is extended or adjusted under 35 U.S.C. 154(b) by 391 days.

(21) Appl. No.: 14/804,243

(22) Filed: Jul. 20, 2015

(65) Prior Publication Data

US 2017/0024894 A1     Jan. 26, 2017

(51) Int. Cl.
| | |
|---|---|
| *G01C 3/08* | (2006.01) |
| *G01S 7/48* | (2006.01) |
| *G01S 17/89* | (2006.01) |
| *G06F 17/30* | (2006.01) |
| *G06K 9/00* | (2006.01) |
| *G06T 15/20* | (2011.01) |
| *H04N 5/341* | (2011.01) |
| *H04N 5/3745* | (2011.01) |

(Continued)

(52) U.S. Cl.
CPC ............ *G01S 7/4808* (2013.01); *G01S 7/486* (2013.01); *G01S 17/89* (2013.01); *G06F 17/30032* (2013.01); *G06K 9/00335* (2013.01); *G06T 7/50* (2017.01); *G06T 15/20* (2013.01); *H04N 5/341* (2013.01); *H04N 5/37452* (2013.01); *G06T 2200/04* (2013.01); *G06T 2207/10028* (2013.01)

(58) Field of Classification Search
CPC ....... G06T 2200/04; G06T 2207/10028; G06T 7/50; G06T 15/20; G01S 7/486; G01S 7/4808; G01S 17/89; H04N 5/37452; H04N 5/341; G06K 9/0035; G06F 17/30032
USPC ....................................................... 356/5.01
See application file for complete search history.

(56) References Cited

U.S. PATENT DOCUMENTS

| 7,450,220 B2 | 11/2008 | O'connor et al. |
| 8,203,699 B2 | 6/2012 | Barnji et al. |

(Continued)

OTHER PUBLICATIONS

Wan, Gordon, et al., "CMOS Image Sensors With Multi-Bucket Pixels for computational Photography", *IEEE Journal of Solid-State Circuits*, vol. 47, No, Apr. 2012, 1031-1042.

(Continued)

*Primary Examiner* — Mark Hellner
(74) *Attorney, Agent, or Firm* — Fish & Richardson P.C.

(57) ABSTRACT

An apparatus is described having an image signal processor. The image signal processor has a plurality of depth calculation units to calculate a respective time of flight depth value for different pixel array locations. Each of the plurality of depth calculation units is to receive a response signal from a same pixel in a pixel array so that the plurality of depth calculation units are able to calculate multiple depth values for the different locations of the pixel array from respective response signals from different groups of pixels in the pixel array of which the pixel is a member. Each of the groups include pixels of different receive clock phases sufficient to calculate a respective depth value. Another apparatus is also described where multiple depth values are similarly calculated from different groups of pixels that each include a same pixel but where a depth calculation unit calculates each of the multiple depth values.

17 Claims, 7 Drawing Sheets

(51) Int. Cl.
  *G01S 7/486* (2006.01)
  *G06T 7/50* (2017.01)

(56) References Cited

U.S. PATENT DOCUMENTS

| | | | |
|---|---|---|---|
| 8,648,945 B2 | 2/2014 | Ovsiannkiov et al. | |
| 8,983,233 B2* | 3/2015 | Katz | G01S 17/107 |
| | | | 348/46 |
| 2008/0036996 A1* | 2/2008 | O'Connor | G01C 3/08 |
| | | | 356/5.01 |
| 2011/0129123 A1 | 6/2011 | Ovsiannikov et al. | |
| 2014/0071180 A1 | 3/2014 | Shin et al. | |
| 2014/0300700 A1 | 10/2014 | Barnji et al. | |
| 2014/0375977 A1 | 12/2014 | Ludwig et al. | |
| 2015/0130904 A1* | 5/2015 | Bae | G01S 7/4915 |
| | | | 348/46 |
| 2017/0048468 A1* | 2/2017 | Pain | H04N 5/345 |

OTHER PUBLICATIONS

PCT/US2016/037029—International Search Report & Written Opinion, dated Oct. 11, 2016, 11 pages.

\* cited by examiner

| | | | | | | | |
|---|---|---|---|---|---|---|---|
| 2 | 4 | 1 | 4 | 2 | 4 | 1 | 4 |
| 1 | 3 | 2 | 3 | 1 | 3 | 2 | 3 |
| 2 | 4 | 1 | 4 | 2 | 4 | 1 | 4 |
| 1 | 3 | 2 | 3 | 1 | 3 | 2 | 3 |
| 2 | 4 | 1 | 4 | 2 | 4 | 1 | 4 |
| 1 | 3 | 2 | 3 | 1 | 3 | 2 | 3 |
| 2 | 4 | 1 | 4 | 2 | 4 | 1 | 4 |
| 1 | 3 | 2 | 3 | 1 | 3 | 2 | 3 |

METHOD AND APPARATUS FOR INCREASING THE RESOLUTION OF A TIME OF FLIGHT PIXEL ARRAY

FIELD OF INVENTION

The field of invention pertains to image processing generally, and, more specifically, to a method and apparatus for increasing the resolution of a time of flight pixel array.

BACKGROUND

Many existing computing systems include one or more traditional image capturing cameras as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

One depth information capturing approach, referred to as "time-of-flight" imaging, emits light from a system onto an object and measures, from multiple pixels of an image sensor, the time between the emission of the light and the reception of its reflected image upon the sensor. The image produced by the time of flight pixels corresponds to a three-dimensional profile of the object as characterized by a unique depth measurement (z) at a plurality of different (x,y) pixel locations.

SUMMARY

An apparatus is described having an image signal processor. The image signal processor has a plurality of depth calculation units to calculate a respective time of flight depth value for different pixel array locations. Each of the plurality of depth calculation units is to receive a response signal from a same pixel in a pixel array so that the plurality of depth calculation units are able to calculate multiple depth values for the different locations of the pixel array from respective response signals from different groups of pixels in the pixel array of which the pixel is a member. Each of the groups include pixels of different receive clock phases sufficient to calculate a respective depth value. Another apparatus is also described where multiple depth values are similarly calculated from different groups of pixels that each include a same pixel but where a depth calculation unit calculates each of the multiple depth values.

An apparatus is described having means for generating a time of flight response signal with a pixel in a pixel array having a receive clock phase. The apparatus also includes means for calculating different depth values from different sets of time of flight response signals generated from different groups of pixels in the pixel array, where, the pixel is a member of each of the groups, and, each set of the sets is generated with receive clock phases sufficient to perform a time of flight depth calculation.

FIGURES

The following description and accompanying drawings are used to illustrate embodiments of the invention. In the drawings.

DETAILED DESCRIPTION

Figure 1:
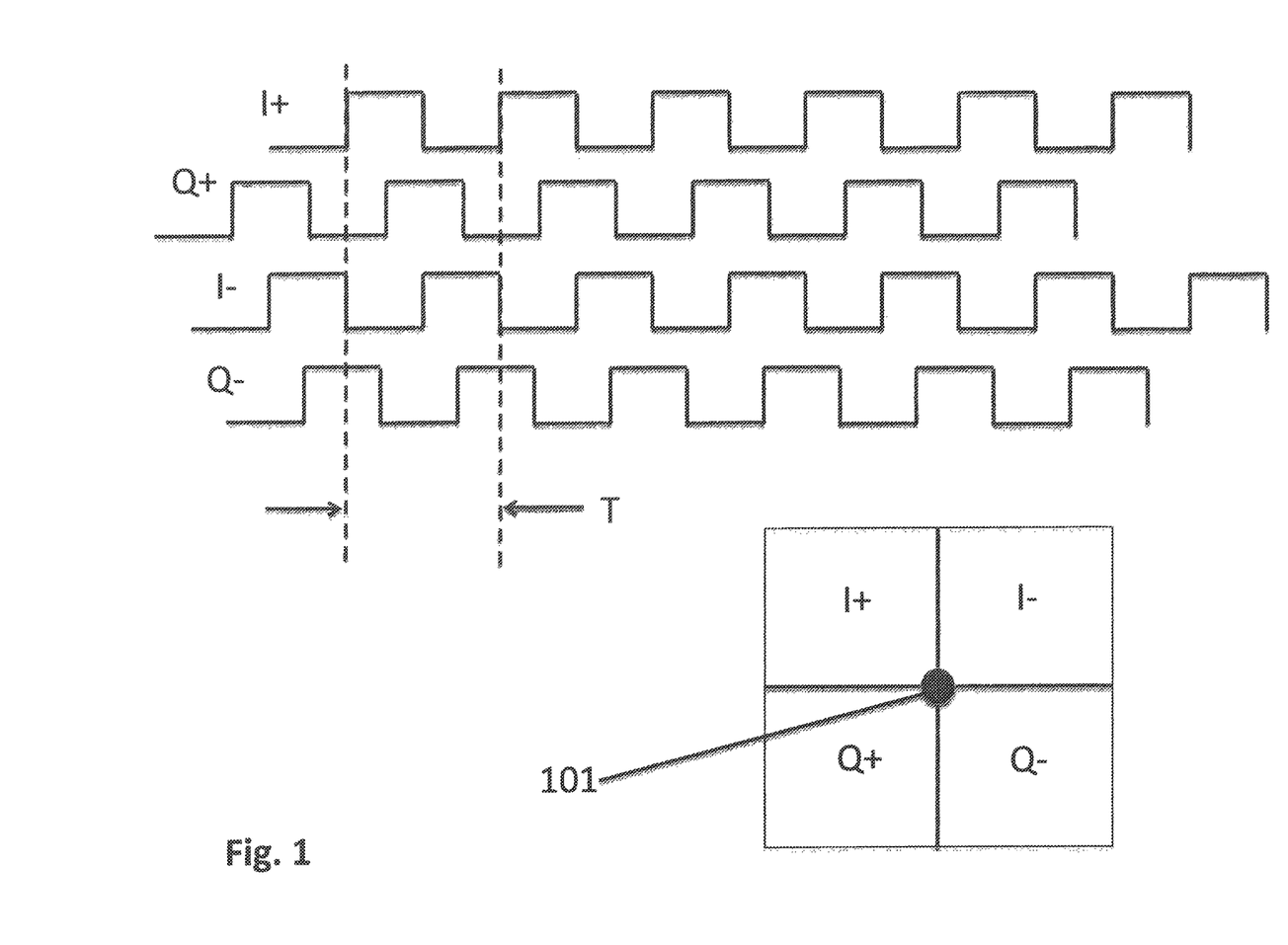
FIG. 1 shows a time-of-flight system.

FIG. 1 shows a depiction of the operation of a time of flight system. In the approach of FIG. 1, non visible (e.g., infra-red (IR)) light is emitted from a camera that the image sensor is a part of. The light reflects from the surface of an object in front of the camera and impinges upon the pixels of an IR pixel array. Each pixel generates signals in response to the received IR light during the time period in which each respective pixel is active (that is, not all pixels in the array need be active at the same time). Groups of these signals from corresponding groups of the pixels are processed to determine the distance between each pixel group and its corresponding portion of the object which results in an overall 3D image of the object.

The set of waveforms observed in FIG. 1 correspond to an embodiment of the clock signals that are provided to a group of four pixels that generate signals for determining a depth value for pixel array location 101 (note that the waveforms can be analog (e.g., sinusoidal) and are not limited to being digital as depicted in FIG. 1). Specifically, a set of quadrature clock signals I+, Q+, I−, Q− are respectively applied to an I+ pixel, a Q+ pixel, an I− pixel and a Q− pixel. As is known in the art, the I+ signal typically has 0° phase, the Q+ signal typically has a 90° phase offset, the I− signal typically has a 180° phase offset and the Q− signal typically has a 270° phase offset. The four pixels collect charge from the incident IR light in accordance with the unique pulse position of their respective clock signals and generate four respective signals in response. Typically, the exposure time for the group of four pixels consumes multiple clock cycles T as only a small amount of charge may be collected per clock cycle and therefore multiple clock cycles are needed to generate sufficient charge in each pixel before a strong enough output signal can be provided. Thus, "readouts" of the pixels may be made periodically with a number of clock cycles inserted between each readout.

For any particular readout, the four response signals generated by the group of four pixels are processed to determine the distance from location 101 to the object in front of the camera. The process then repeats for a next readout cycle to determine a next distance value for the same location 101. As such, note that a single Z pixel value can be generated for location 101 from the group of four pixels for every readout cycle (which again may consume multiple clock cycles T).

A problem is the granularity or resolution of the produced image. Here, a large surface area that consumes four pixels is needed to generate only a single depth value. This corresponds to a 1:4 reduction in the resolution of the image as compared to the actual resolution of the physical pixels in the pixel array.

Figure 2:
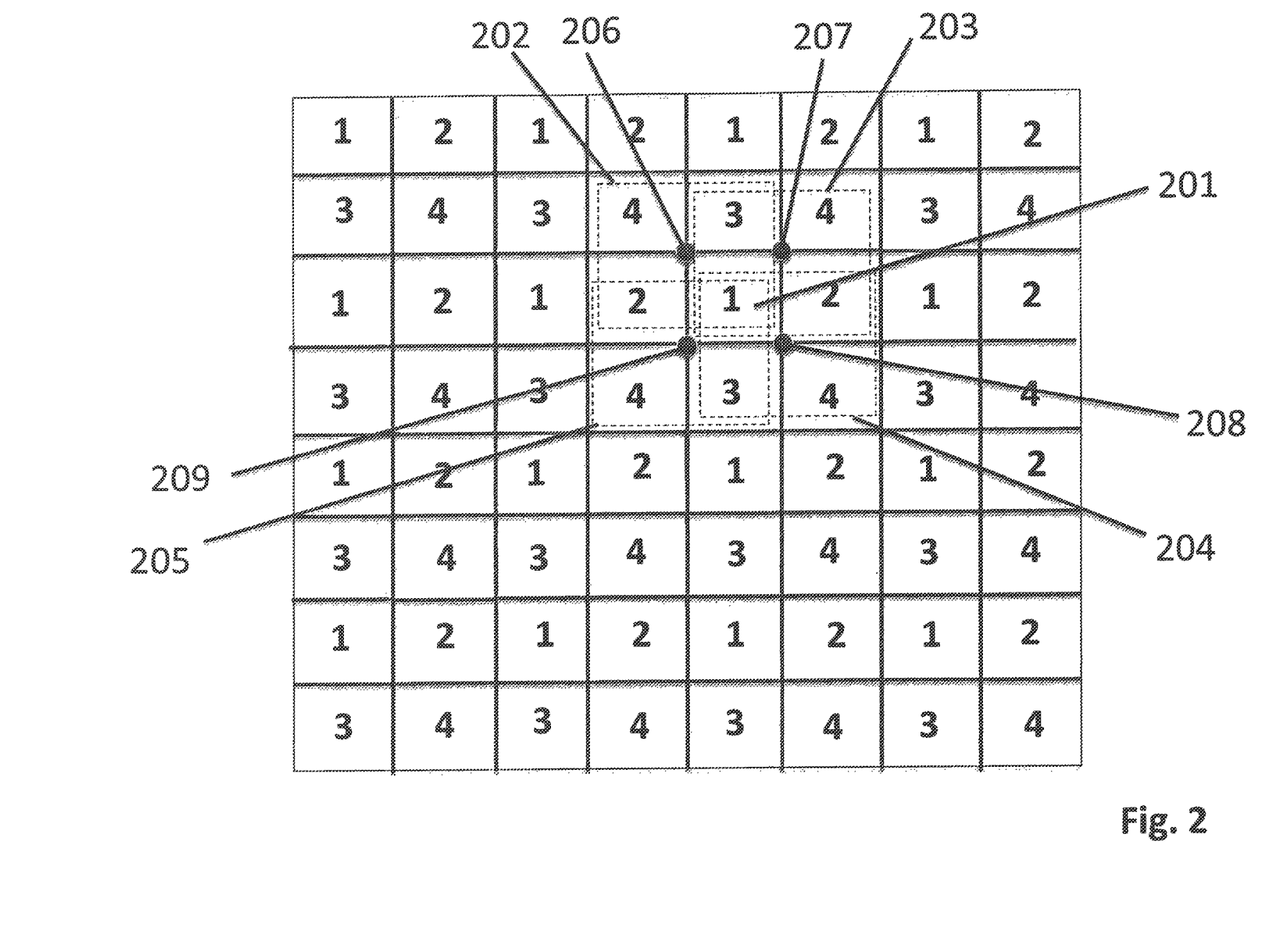
FIG. 2 shows a time-of-flight pixel array suited for enhanced image resolution.

FIG. 2 pertains to an improved approach having a 1:1 resolution as between the generated IR image and the actual physical pixels within the pixel array. Whereas in the approach of FIG. 1 only one depth value could be generated per four pixels, by contrast, in the approach of FIG. 2, four depth values can be generated for every four pixels.

The approach of FIG. 2 is based on assigning the different receive clock phases in a specific pattern across the pixel array so that each pixel in the IR pixel array can be viewed as being a member of four different pixel groups that each include all four clock signals within it. Because each pixel can be associated with four different groups each capable of generating its own respective depth value, the resolution of the image approaches one depth value for every pixel (rather than one depth value for every four pixels).

FIG. 2 shows an IR pixel array where each different receive clock phase is given a number: 1, 2, 3 or 4. As can be seen from FIG. 2, the receive clock phases are distributed to the different IR pixels across row pairs in a regular pattern of:

121212 . . .
343434 . . . .

Focusing on pixel 201, note that pixel 201 can be viewed as being a member of four different groups of four pixels 202, 203, 204 and 205. With respect to pixel group 202, pixel 201 occupies the lower right hand corner of the group. With respect to pixel group 203, pixel 201 occupies the lower left hand corner of the group. With respect to pixel group 204, pixel 201 occupies the upper left hand corner of the group. With respect to pixel group 205, pixel 201 occupies the upper right hand corner of the group.

Importantly, because of the aforementioned regular pattern of clock phases, each of the four groups 202, 203, 204, 205 includes all four phases 1, 2, 3 and 4 within its constituent pixels. That is, each pixel within any of these groups has a receive clock whose phase is different than any other pixel within that same group. As such, each group 202, 203, 204, 205 is able to generate its own corresponding depth value. Specifically, pixel group 202 is able to generate a depth value that corresponds to array location 206, pixel group 203 is able to generate a depth value that corresponds to array location 207, pixel group 204 is able to generate a depth value that corresponds to array location 208 and pixel group 205 is able to generate a depth value that corresponds to array location 209.

A depth value can therefore be generated at each corner of pixel 201. Owing to the repetitiveness of the regular pattern at which the different phased receive clock signals are routed to the different pixels, a depth value can be generated for all pixel corners having four adjacent pixels (i.e., all pixels except the outermost pixels of the IR pixel array). As such, depth values can be generated at a resolution that is approximately the same as the resolution of the physical pixels themselves. The approach of FIG. 2 is therefore able to generate depth images at a resolution that is approximately 4 times that of the approach of FIG. 1.

Importantly, each of the generated depth values correspond to true depth calculations made for a particular array location. That is, they do not involve any linear combination or other interpolation of other depth values calculated for other array locations. In this sense, the resolution enhancement is actual rather than interpolated. Importantly, in various embodiments, the depth calculation itself is a non-linear formulation—e.g., it is a ratio of the difference in collected charge between two pixel/phase pairs. Merely interpolating or averaging values between pixels in the approach of FIG. 1 to increase resolution is not mathematically the same as actually calculating the ratio at different locations with increased resolution as in the approach of FIG. 2.

Figure 3:
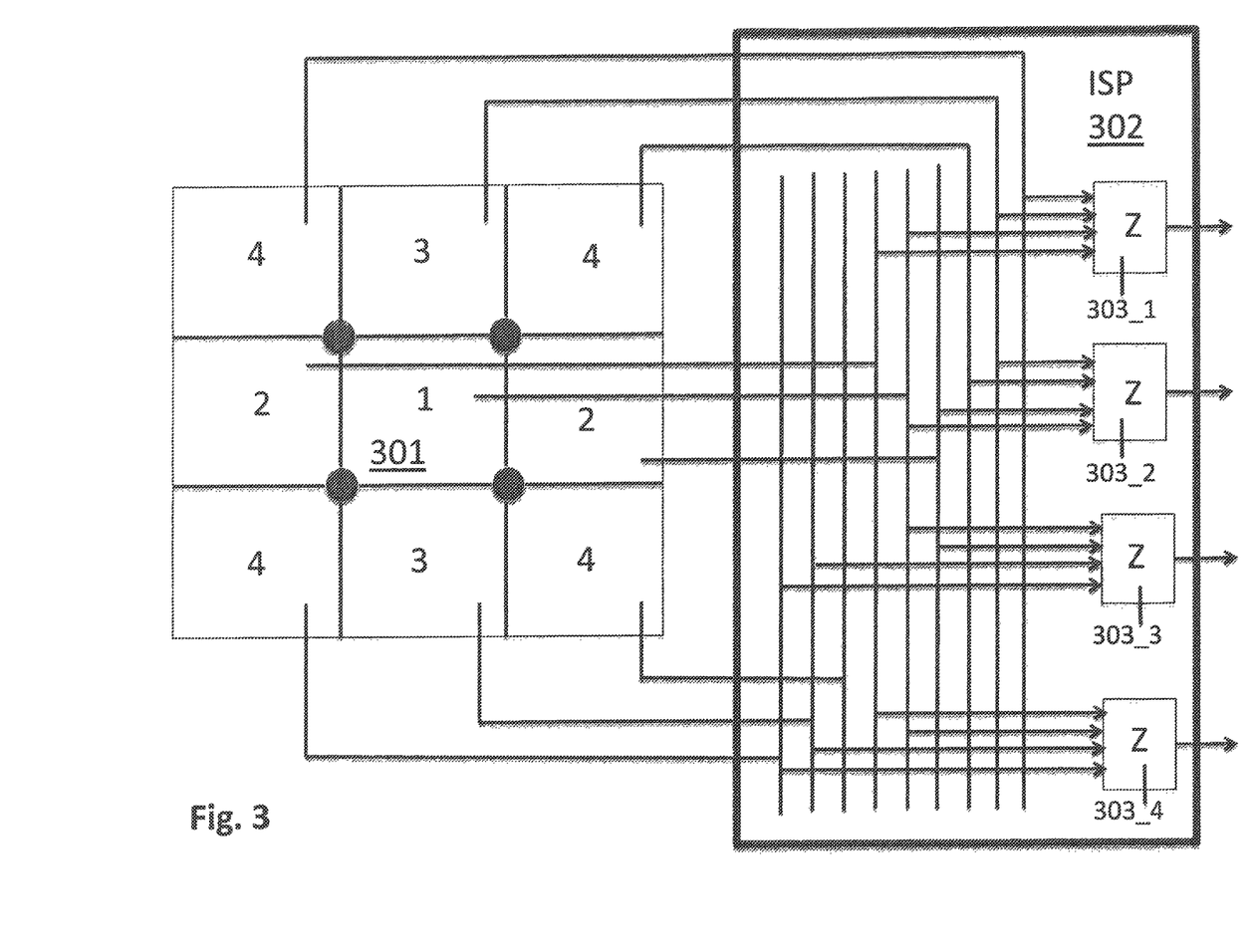
FIG. 3 shows an embodiment of a pixel array and image signal processor that implement the improved approach of FIG. 2.

FIG. 3 shows how an image signal processor (ISP) 302 may be designed to handle the improved approach of FIG. 2. As observed in FIG. 3, the ISP routes a response signal from a particular pixel to four different depth calculation units 303_1 through 303_4. A depth calculation unit calculates a depth value from four differently phased response signals generated by the pixels. The particular input signals that are routed to any particular depth calculation unit correspond to one of the group of four pixels from which a particular depth value is calculated.

For example, referring to both FIGS. 2 and 3, depth calculation unit 303_1 receives the input signals associated with group 202, depth calculation unit 303_2 receives the input signals associated with group 203, depth calculation unit 303_3 receives the input signals associated with group 204 and depth calculation unit 303_4 receives the input signals associated with group 205. Importantly, each depth calculation unit 303_1 through 303_4 can operated in parallel or otherwise concurrently. As such, four pixel values can be generated concurrently.

The ISP 302 may be implemented with programmable or hardwired logic circuitry. A field programmable gate array (FPGA) or programmable logic device (PLD) are examples of the former while dedicated logic circuitry is an example of the later. Here, each depth calculation unit may be implemented as a separate instance of such logic circuitry.

FIG. 3 does not show any specific circuitry to indicate concurrent generation of all four pixel values other than the placement of the depth calculation units 303_1 through 303_4 in a parallel arrangement. Conceivably, all four depth calculation units could be coupled to the same readout clock signal so that each operate synchronously in unison. Here, for example, four output depth values are generated for each readout clock cycle.

Alternatively to logic circuitry, the ISP 302 may be implemented as software or firmware or other form of program code that executes on a processor or processing core of some kind. Here, for instance, each depth calculation unit may be viewed as a separate instance of a depth calculation instruction sequence where each instruction sequence concurrently executes on the underlying processing core in order to generate all four pixel values substantially in parallel. For example, if the ISP is implemented as a multi-threaded processor, each depth calculation unit is implemented as a separate thread of depth calculation instructions that the processor concurrently executes.

The ISP 302 may also be implemented as some combination of hardware logic circuitry and software. Regardless, to the extent the depth calculation units operate on digital values, an analog-to-digital converter may be present between a pixel and its corresponding depth calculation units to digitize the response signal that is generated by the pixel. In still yet other implementations it is conceivable that the depth calculation units may be implemented as analog circuits in which case no such analog-to-digital circuitry would be present.

Although the above discussion emphasized that the different depth values can be calculated concurrently, in practice, they do not strictly need to be. For example, a single depth calculation unit could receive different sets of response signals that are digitized and stored in a buffer memory and/or register. The sets of response signals are then forwarded to and operated on by the single depth calculation unit in succession.

The granularity at which different pixel values are multiplexed into a same depth calculation unit may vary from embodiment. For example, the different pixel values of a same pixel group may be separately stored and forwarded into a same depth calculation unit and/or the respective pixel values of different pixel groups may be separately stored and forwarded into a same depth calculation unit. Such approaches may be particularly suitable for, e.g., a pixel array that does not readout all pixel array rows simultaneously (e.g., where a rolling shutter approach is utilized).

Embodiments of the pixel array 301 and ISP 302 may implement the pixel array 301 and ISP 302 on separate semiconductor die or may integrate the pixel array 301 and ISP 302 on the same semiconductor die. In embodiments of the later, the ISP 302 (or portions thereof) may be physically integrated into the same surface area as the pixel array 301. For example, an array of depth value computation unit circuit instances (or portions of them) may be physically integrated amongst the pixels (e.g., a depth value computation unit may be physically located near, within, amongst, etc. the four pixels that is determines a depth value for).

Figure 4:
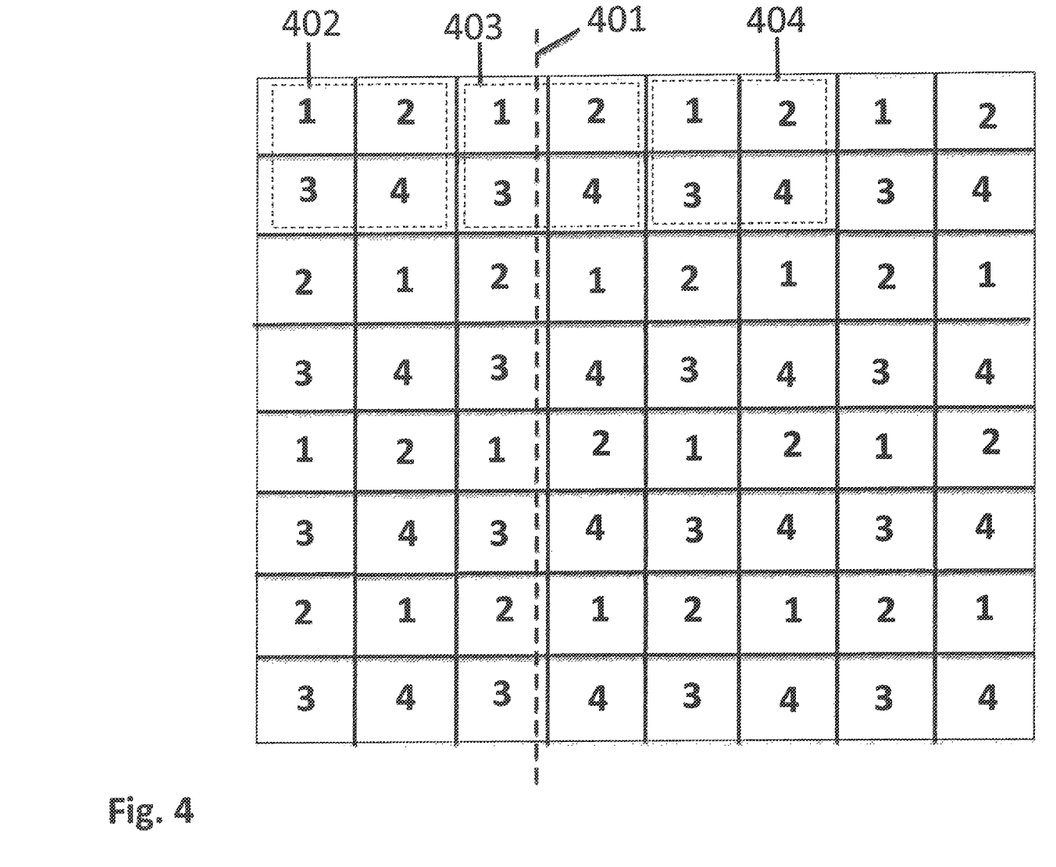
FIG. 4 shows another time-of-flight pixel array suited for enhanced image resolution.

FIG. 4 shows an improved receive clock phase allocation pattern as compared to the patterns of FIGS. 2 and 3. The improved phase allocation pattern provides an overall signal from the pixel array that provides for easier filtering out of edge effects or edge distortions.

Here, assume that the pixel array is facing a surface with an abrupt edge such as a set of stairs. Line 401 corresponds to the step between two neighboring stair landings. Group 402 (and each group beneath group 402 as observed in FIG. 4) corresponds to the "top" or closer landing to the camera and group 404 (and each group beneath group 404 as observed in FIG. 4) corresponds to the "bottom" or farther landing from the camera.

All of these groups should correspond to a healthy or clean depth calculation because all of their associated pixels are aligned with a same surface of a particular landing. Being closer to the camera because they are aligned with the upper landing, group 402 and the groups beneath group 402 will generate a smaller depth value than group 404 and the groups beneath group 404.

Group 403 and the groups beneath group 403 will generate an improper reading because the edge between the two staircase landings runs through them. Some of the pixels are aligned with the upper landing while other pixels are aligned with the lower landing. Thus group 403 and the groups beneath 403 will produce depth values that are in error and are likely to be widely different than any of the values associated with group 402 or group 404.

It is conceivable that the sheer difference in the depth value between group 403 and groups 402 and 404 may be enough to filter out all readings associated with group 403 and its associated lower groups. However, for an ISP or other processing component that processes the signal from the array, there is no way of knowing whether the widely different values correspond to error or the actual structure of the object being observed.

As observed in FIG. 4, the improved pattern of FIG. 4 alternates the sequence of one of the row instances across the pixel array. Specifically, whereas one row having phases 1 and 2 is expressed in the pattern as

121212 . . .

by contrast the subsequent row with the same clock phases is expressed later in the pattern as

212121 . . . .

By alternating the pattern for one of the row instances, the pixel values produced from the groups along line 401 will regularly fluctuate along line 401 and therefore will be easier to identify as "noise" that can be filtered out. The alternating of the row pattern has no detrimental effect on the other groups that line 401 does not pass through because all of these groups still contain all four phases.

Figure 5:
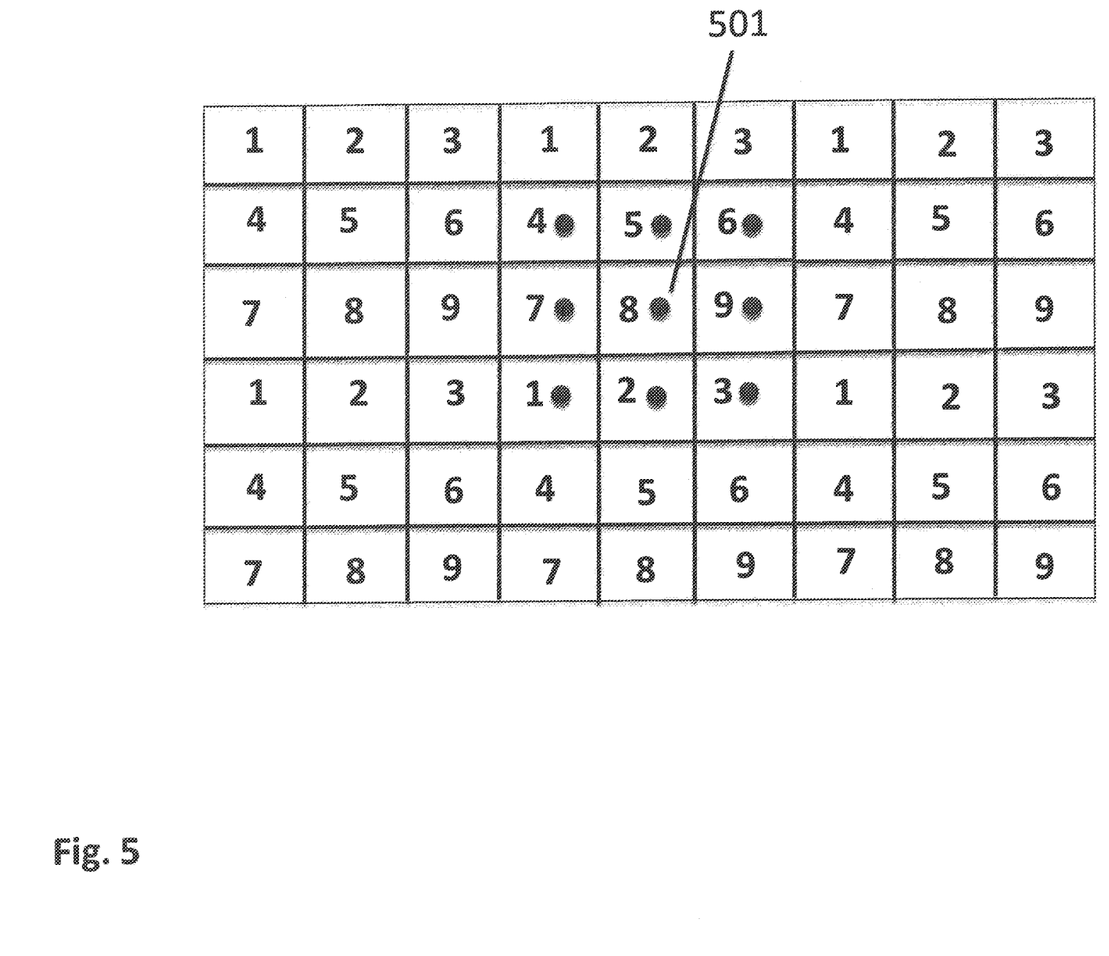
FIG. 5 shows another time-of-flight pixel array suited for enhanced image resolution.

FIG. 5 indicates that the teachings herein can be applied to other time-of-flight systems besides a four phase time-of-flight system. Here, FIG. 5 depicts the pattern of phases applied to a pixel array for a time-of-flight system that uses nine different receive clock phases. Focusing on pixel 501, note there are nine different groups of nine pixels that pixel 501 can be considered a member of where each group contains all nine phases. From these groups, one unique depth value can be calculated for pixel 501 and all of its surrounding pixels. As such the approach of FIG. 5 is capable of generating a depth value for each pixel location.

Figure 6:
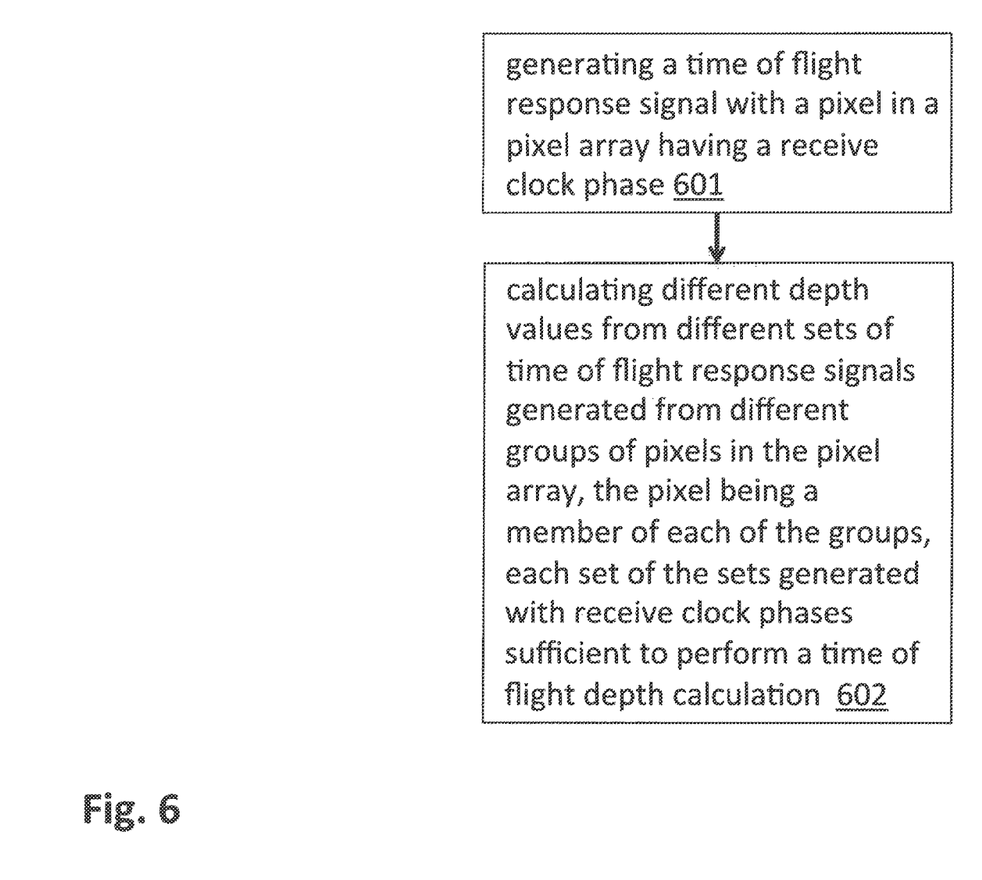
FIG. 6 shows a method for capturing a time-of-flight image with enhanced granularity.

FIG. 6 shows a method performed by a time of flight system as described herein. As observed in FIG. 6 the method includes generating a time of flight response signal with a pixel in a pixel array having a receive clock phase 601. The method also includes calculating 602 different depth values from different sets of time of flight response signals generated from different groups of pixels in the pixel array, where, the pixel is a member of each of the groups and each set of the sets is generated with receive clock phases sufficient to perform a time of flight depth calculation.

Although the discussion above has concentrated on discussing a subsection of a pixel array, it should be understood that the techniques described above can be applied over, e.g., an entirety of a pixel array to generate a three dimensional image of an object in front of a time of flight camera. The image may be used, e.g., to identify a face or a hand gesture. Additionally, although embodiments above have emphasized the reuse of a same pixel signal for the multiple depth calculations for each of the groups to which the pixel belongs, it is conceivable that other embodiments may exist where, rather than reusing a same signal, multiple signals from the same pixel are generated for multiple depth calculations.

Figure 7:
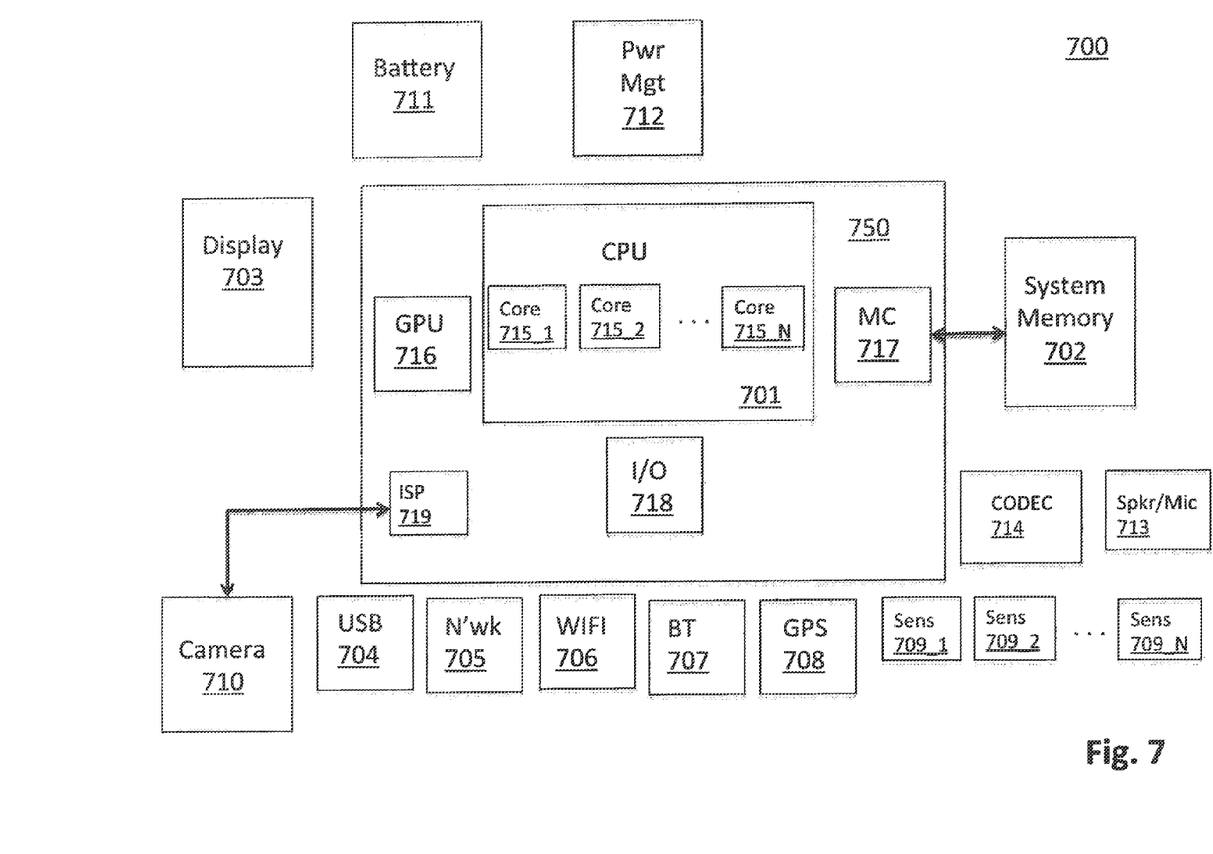
FIG. 7 shows a computing system.

FIG. 7 shows a depiction of an exemplary computing system 700 such as a personal computing system (e.g., desktop or laptop) or a mobile or handheld computing system such as a tablet device or smartphone. As observed in FIG. 7, the basic computing system may include a central processing unit 701 (which may include, e.g., a plurality of general purpose processing cores) and a main memory controller 717 disposed on an applications processor or multi-core processor 750, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a main memory controller 717, an I/O control function 718 and one or more image signal processor processors 719. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702. The image signal processing processors 719 receive image information from the camera and process the raw image information for downstream uses. The power management control unit 712 generally controls the power consumption of the system 700.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750.

In an embodiment one or more cameras 710 having a light source to illuminate an object and a pixel array that receives multiple clock phases to implement a time-of-flight depth measurement system. The image signal processor(s) 719 may be designed to run a same response signal from a pixel to more than one depth calculation unit to improve the resolution of the captured image consistent with the teachings above. In an embodiment, the light source is an IR light source and the pixels of the pixel array are sensitive to IR light.

Application software, operating system software, device driver software and/or firmware executing on a general purpose CPU core (or other functional block having an instruction execution pipeline to execute program code) of an applications processor or other processor may direct commands to and receive image data from the camera system.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
    an infrared (IR) pixel array in which an n by n sub-array of the pixels is organized as four different, m by m groups of pixels in which only a single, particular pixel is a member of all four groups, m being one less than n, and each pixel within any group of pixels receiving a clock signal whose phase is different than any other pixel within a same group;
    an image signal processor having four depth calculation units associated with each n by n sub-array of the pixels, the four depth calculation units to calculate a respective time of flight depth value for different pixel array locations associated with the four different, m by m groups of pixels, each of the one or more depth calculation units to receive a same response signal from a pixel the IR pixel array so that said four depth calculation units are able to calculate multiple depth values for said different pixel array locations of said IR pixel array from the different groups of pixels in said pixel array of which said pixel is a member.

2. The apparatus of claim 1 wherein said four depth calculation units are composed of logic circuitry.

3. The apparatus of claim 2 wherein said four depth calculation units are composed of dedicated logic circuitry.

4. The apparatus of claim 2 wherein said four depth calculation units are arranged to concurrently calculate said multiple depth values.

5. The apparatus of claim 1 wherein said image signal processor is implemented as a processor that executes program code and said four depth calculation units are implemented as one or more program code sequences, said one or more program code sequences being stored on a machine readable storage medium.

6. The apparatus of claim 5 wherein said processor is a multi-threaded processor and said one or more program sequences comprise multiple program code instances that are to be executed on different threads.

7. The apparatus of claim 1 wherein said different receive clock phases include I+, I−, Q+ and Q−.

8. The apparatus of claim 1 wherein said pixel array's per pixel receive clock allocation exhibits a pattern of:
    121212 . . .
    343434 . . .
    where 1, 2, 3 and 4 above correspond to different receive clock phases.

9. The apparatus of claim 8 wherein said pixel array's per pixel receive clock allocation exhibits a pattern of:
    121212 . . .
    343434 . . .
    212121 . . . .

10. A computing system, comprising:
    a processing core;
    an I/O control hub;
    an infrared (IR) pixel array in which an n by n sub-array of the pixels is organized as four different, m by m groups of pixels in which only a single, particular pixel is a member of all four groups, m being one less than n, and each pixel within any group of pixels receiving a clock signal whose phase is different than any other pixel within a same group;
    an image signal processor having four depth calculation units associated with each n by n sub-array of the pixels, the four depth calculation units to calculate a respective time of flight depth value for different pixel array locations associated with the four different, m by m groups of pixels, each of the one or more depth calculation units to receive a same response signal from a pixel the IR pixel array so that said four depth calculation units are able to calculate multiple depth values for said different pixel array locations of said IR pixel array from the different groups of pixels in said pixel array of which said pixel is a member.

11. The computing system of claim 10 wherein said four depth calculation units are composed of logic circuitry.

12. The computing system of claim 11 wherein said four depth calculation units are composed of dedicated logic circuitry.

13. The computing system of claim 11 wherein said four depth calculation units are arranged to concurrently calculate said multiple depth values.

14. The computing system of claim 10 wherein said image signal processor is implemented as a processor that executes program code and said four depth calculation units are implemented as program code sequences, said program code sequences being stored on a machine readable storage medium.

15. The computing system of claim 10 wherein said four depth calculation units are designed to concurrently calculate said multiple depth values.

16. The computing system of claim 12 wherein said image signal processor is implemented as a processor that executes program code and said four depth calculation units are implemented as program code sequences stored on a machine readable storage medium.

17. The computing system of claim 12 wherein said four depth calculation units are designed to concurrently calculate said multiple depth values.

* * * * *